Sept. 6, 1932.  C. P. CIRAC  1,875,417
REVERSE STOP FOR VEHICLES
Filed Feb. 1, 1930  2 Sheets-Sheet 2
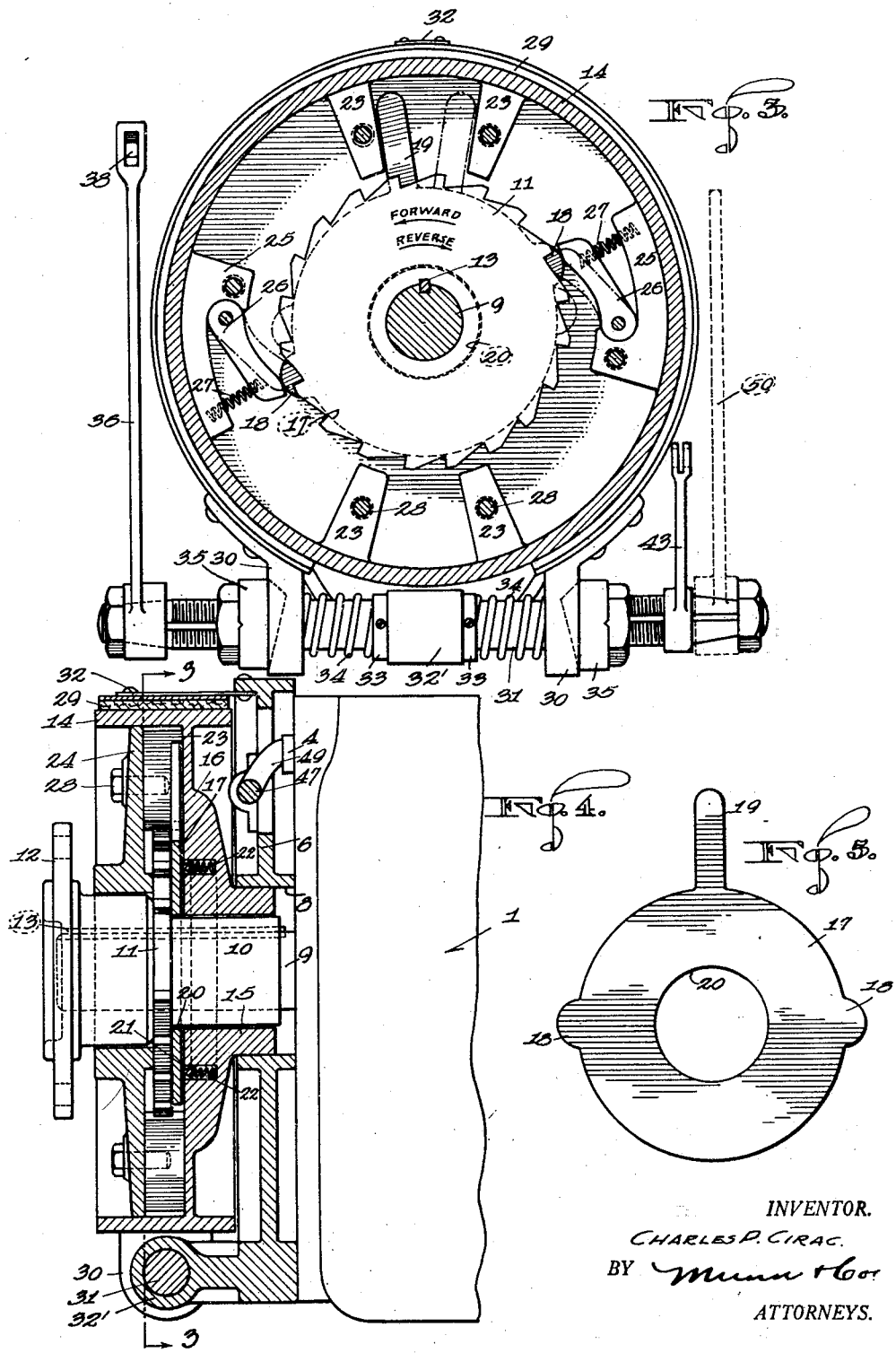
INVENTOR.
CHARLES P. CIRAC.
BY
ATTORNEYS.

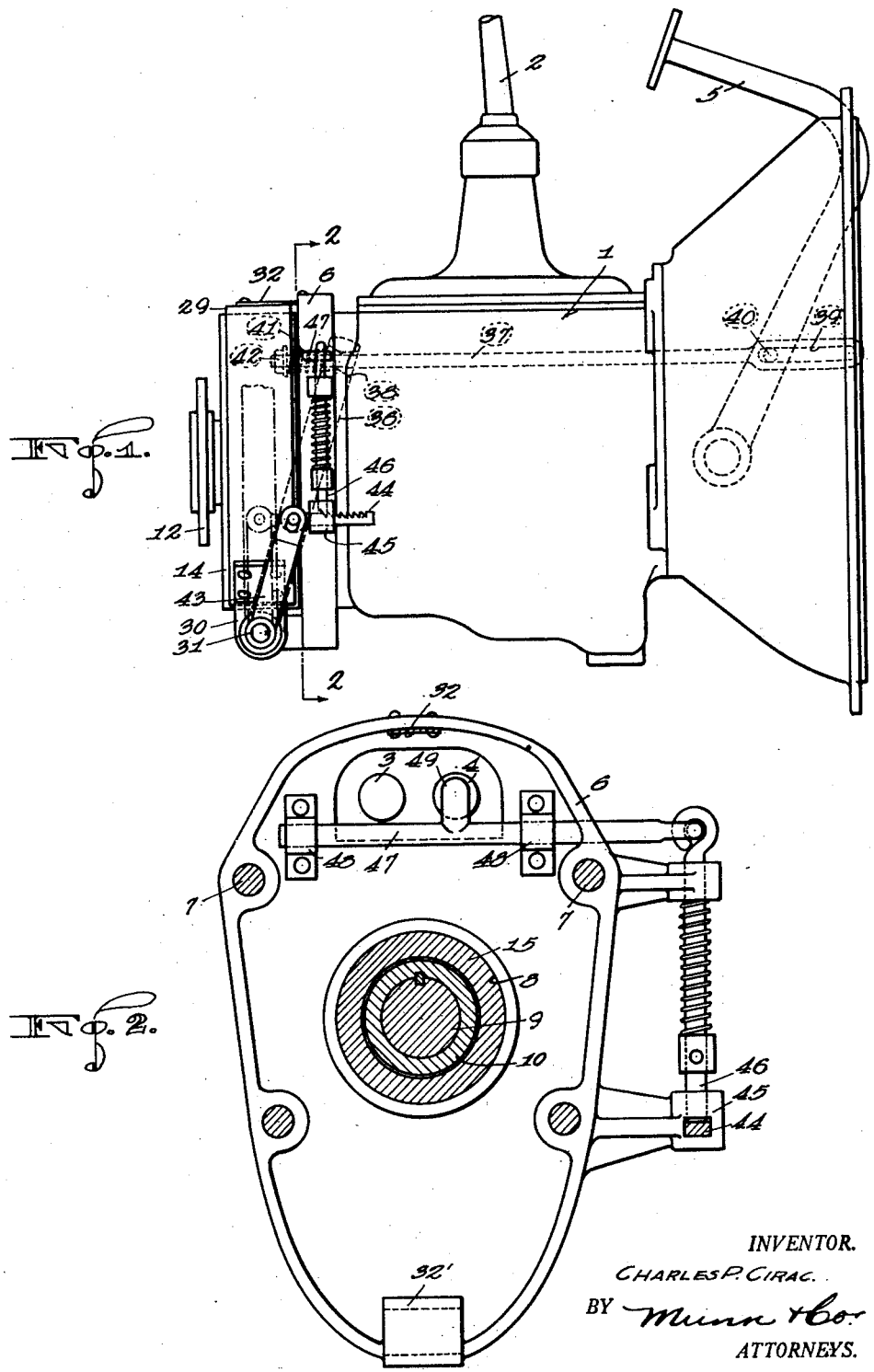

Patented Sept. 6, 1932

1,875,417

UNITED STATES PATENT OFFICE

CHARLES P. CIRAC, OF SAN FRANCISCO, CALIFORNIA, ASSIGNOR TO CIRAC AUTOMATIC REVERSE CONTROL COMPANY, OF SAN FRANCISCO, CALIFORNIA

REVERSE STOP FOR VEHICLES

Application filed February 1, 1930. Serial No. 425,218.

My invention relates to improvements in reverse stops for vehicles, and it consists in the combinations, constructions and arrangements hereinafter described and claimed.

An object of my invention is to provide a reverse stop for vehicles which is designed to be applied to a standard automobile with but slight alterations being necessary in the latter. The device will not interfere with the normal forward movement of the automobile. The applying of the brake will set the device automatically so that it will prevent rearward movement of the automobile until the gear shift lever is moved into reverse speed position. After the gear shift lever has been moved into this position, the car may be backed up and the device will not function until the brake pedal is again actuated for any purpose whatsoever.

I also provide novel means for causing the device to be silent in operation. I employ a pawl and ratchet mechanism for preventing the rearward movement of the car, and I make use of a special mechanism for automatically throwing the pawls out of engagement with the ratchet during the forward movement of the car in order to prevent the pawls from clicking over the ratchet, thus doing away with an unnecessary noise disturbance.

The device is relatively simple in construction, and is durable and efficient for the purpose intended.

Other objects and advantages will appear as the specification proceeds, and the novel features of the device will be particularly pointed out in the claims hereto annexed.

My invention is illustrated in the accompanying drawings, in which:

Figure 1 is a side elevation of the device shown operatively applied to an automobile, Figure 2 is a section along the line 2—2 of Figure 1, Figure 3 is a section along the line 3—3 of Figure 4, Figure 4 is a longitudinal section through the device, portions being shown in elevation, and Figure 5 is a plan view of a part of the device.

In carrying out my invention, I make use of a standard transmission indicated generally at 1 (see Figure 1). A gear shift lever 2 is carried by the transmission 1 and actuates shifting rods 3 and 4 shown in Figures 2 and 4. A standard brake pedal 5 is also used, and this pedal is shown in Figure 1. The parts thus far described are standard in construction and form no part of my invention except insofar as they cooperate with the parts now to be described.

At the rear of the transmission housing 1, I mount a casting 6 and secure this in place by bolts 7 or other suitable fastening means. Figure 2 shows the rear face view of the casting 6, while Figure 4 shows a section through the casting. It will be noted from Figure 4 that the casting 6 has a central opening 8 through which a shaft 9 from the transmission projects. The shaft 9 carries a ratchet hub 10 on which a ratchet 11 is mounted. Between the ratchet and the end of the shaft 9 I mount one member 12 of a universal joint coupling. The other member of this coupling is secured to the propeller shaft (not shown) of the automobile. The members 10 and 12 are feathered to the shaft 9 at 13 so as to rotate with the shaft as a unit.

Still referring to Figure 4, it will be noted that I mount a brake drum 14 on the hub 10. In actual practice the hub 15 of the brake drum is inserted in the opening 8 prior to the mounting of the hub 10 on the shaft 9. The brake drum 14 is free to rotate on the hub 10 and in the bore 8.

Between the central portion 16 of the brake drum 14 and the ratchet 11 I dispose a friction cam plate 17 of the shape shown in Figure 5. This plate carries cams 18 and a finger 19. An opening 20 in the plate loosely receives the hub 10.

The plate is frictionally held against the side of the ratchet 11 by means of a friction ring 21 which is triangular in cross section. Springs 22 seated in the portion 16 yieldingly hold the ring 21 in contact with the cam plate 17 and urge this plate against the ratchet 11 for a purpose hereinafter described. The ring 21 contacts with the plate 17 in a single circular line, and this reduces the wear between the parts so as to increase the life of the device. In Figure 3 I show reinforcing ribs 23 that are integral with the brake drum 14 and that extend inwardly from the rim of the drum for a short distance. I show four of these ribs, although any number may be provided. The ribs space a cover plate 24 shown in Figure 4 from the portion 16 so as to provide a space for the ratchet 11 and the cam plate 17. The finger 19 of the cam plate is disposed between two of the ribs, and the ribs act as stops for the movement of the finger. This movement will be described later.

The brake drum 14 also carries integral portions 25 that act as partial housings for pawls 26. The pawls are yieldingly moved into engagement with the ratchet 11 by springs 27. The pawls are held out of engagement with the ratchet when the cam plate 17 is in the full line position shown in Figure 3. When the cam plate is in this position, the cams 18 space the pawls 26 away from the teeth of the ratchet as shown. Bolts 28 are used for securing the cover plate 24 to the brake drum 14.

I dispose a brake band 29 around the brake drum 14, and the ends of the band carry lugs 30 (see Figure 3) that are slidably mounted on a shaft 31. The mid portion of the brake band is normally supported by a leaf spring 32 (see Figure 4), and this leaf spring prevents the dragging of the brake band on the drum when the brake band is not tightened. When the band is tightened, the spring has sufficient give to permit the band to snugly engage with the brake drum and to stop its rotation.

The shaft 31 is rotatably mounted in a bearing 32' carried by the casting 6 (see Figure 2). Collars 33 are mounted on the shaft 31 and are disposed on each side of the bearing 32' to prevent longitudinal movement of the shaft with respect to the bearing. Coil springs 34 are disposed between the collars 33 and the lugs 30 for yieldingly moving the lugs away from each other for releasing the brake. Cam members 35 are mounted on the shaft 31 and are rocked when the shaft is rocked for causing the lugs to move toward each other for applying the brake.

Means for rocking the shaft 31 is shown in Figures 1 and 3. An arm 36 is keyed to the shaft 31, and Figure 1 shows how this arm loosely receives a rod 37 in an opening 38. The end of the rod 37 furthest removed from the arm 36 is provided with a slot 39, and this slot slidably receives a pin 40 carried by the brake pedal 5. A spring 41 shown in dotted lines in Figure 1 is mounted on the rod 37 and is disposed between the arm 36 and a nut 42 carried by the end of the rod. The positions of the spring will be described later.

A short arm 43 (see Figure 3) is mounted on the shaft 31 and is pivotally connected to a rack 44 (see Figure 1) which is slidably mounted in a guide 45. A spring-pressed pawl 46 prevents the movement of the rack 44 to the left when the rack has been manually moved to the right in Figure 1. The releasing of the pawl 46 is controlled by a rocker rod 47 (see Figure 2), this rod being rotatably carried by bearings 48. A finger 49 carried by the rod is placed in the path of movement of the shifting rod 4, and when this rod is moved by the gear shift lever 2, it will actuate the rod 47 to free the pawl 46 from the rack 44.

From the foregoing description of the various parts of the device, the operation thereof may be readily understood.

The driver in applying the brake 5 in normal use moves the rod 37 (see Figure 1) to the right, and this will actuate the shaft 31 for causing the brake band 29 to be set and to prevent rotation of the brake drum 14. If the slot 39 is not long enough to permit the normal movement of the brake pedal 5, the spring 41 will compress to permit additional movement of the brake pedal 5. The brake 29 when set by the pedal 5 is held in this position when the pedal is released, because the rack 44 has been moved to the right in Figure 1 during the movement of the pedal 5, and the rack is prevented from return movement by the spring-pressed pawl 46.

During normal forward driving, the ratchet 11 will be rotated counter-clockwise in Figure 3. The cam plate 17 is frictionally held against the ratchet 11, and this will cause the finger 19 to abut the left-hand upper reinforcing rib 23. The rib prevents further movement of the finger 19 to the left. The cams 18 on the cam plate 17 contact with the pawls 26 and hold this out of engagement with the ratchet 11. The ratchet may now continue to rotate to the left during normal forward driving, and there will be no clicking sound because the pawls are held free of the ratchet teeth.

Assume that the car comes to a stop on a hill and the tendency of the car is to roll backwards. This will cause the shaft 9 to turn clockwise in Figure 3 and to turn the ratchet 11 in the same direction. The cam plate 17 will be swung so that the finger 19 will strike the right-hand upper reinforcing rib 23. The finger 19 will come to stop in the dotted line position. This movement carries the cams 18 out of engagement with the pawls 26 and permits them to drop into the teeth of the ratchet 11. Further movement of the ratchet 11 in a clockwise direction will tend to move the drum 14 in the same direction, because the pawls 26 have connected the two together. This movement is prevented by the brake band 29, and the automobile is therefore prevented from rolling rearwardly down the hill.

If the driver wishes to move the car rearwardly, he shifts the gear shift lever into reverse speed position. This will cause the shifting rod 4 to move to the left in Figure 4, and to cause the finger 49 to rock the rod 47. The right-hand end of the rod 47 in Figure 2 is connected to the pawl 46 and releases the pawl from the rack 44. The rack is instantly moved to the left in Figure 1 by the action of the springs 34 on the lugs 30 and the cams 35, and this frees the brake band 29. The ratchet 11 is now free to turn in a clockwise direction, and will carry with it the brake drum 14, thus permitting the car to move rearwardly. A subsequent pressing of the brake pedal 5 will again make the device operative for preventing rearward movement of the car in the manner already described.

At the right-hand side of Figure 3, I show a hand brake lever 50 that is connected to the shaft 31. This lever is secured to the shaft 31, and may be manually actuated for applying the brake 29 should occasion necessitate the use of it.

Although I have shown and described one embodiment of my invention, it is to be understood that the same is susceptible of various changes, and I reserve the right to employ such changes as may come within the scope of the invention as claimed.

I claim:

1. In a reverse stop for vehicles, a rotatable member having a ratchet, a brake drum rotatable on the member and formed with a pair of spaced stops, pawls carried by said drum and operatively engaging with the ratchet, a brake band for locking the drum against movement, a cam having an extended portion arranged between said stops and having a limited throw with respect to the drum, means for yieldingly holding the cam against the ratchet, said ratchet when rotating in one direction moving said cam for releasing the pawls from the ratchet.

2. In a reverse stop for vehicles, a rotatable member having a ratchet, a brake drum rotatable on the member, pawls carried by said drum and operatively engaging with the ratchet, a brake band for locking the drum against movement, a cam having a limited throw with respect to the drum and including an annular portion, means for yieldingly holding the cam against the face of the ratchet, said ratchet when rotating in one direction moving said cam for releasing the pawls from the ratchet, said yielding means comprising a spring-pressed ring triangular-shaped in cross section with a pointed edge thereof circumferentially bearing against the cam face.

3. A reverse stop for vehicles comprising a rotatable member, a brake therefor, a brake pedal for actuating the brake, means for holding the brake in operative position, a gear shift lever controlled means for freeing the brake holding means, said brake holding means comprising a ratchet operatively connected with the brake, and a spring pressed pawl engageable with the ratchet for normally preventing the return movement of the ratchet, said lever controlled means being operatively connected to said pawl.

4. In a reverse stop for vehicles, a rotatable member having a ratchet, a brake drum mounted relative thereto and formed with a pair of spaced stops, pawls carried by said drum and operatively engaging with the ratchet, braking means for locking the drum against movement, and a cam having an extended portion arranged between said stops and having a limited throw with respect to the drum, said ratchet when rotating in one direction moving said cam for releasing the pawls from the ratchet.

5. In a reverse stop for vehicles, a rotatable member having a ratchet, a brake drum mounted relative thereto and formed with a pair of spaced stops, pawls carried by said drum and operatively engaging with the ratchet, braking means for locking the drum against movement, a cam having an extended portion arranged between said stops and having a limited throw with respect to the drum, said ratchet when rotating in one direction moving said cam for releasing the pawls from the ratchet, and means for moving the pawls into engagement with the ratchet when said cam is moved in the opposite direction.

6. In a reverse stop for vehicles, a rotatable member having a ratchet, a brake drum mounted relative thereto, pawls carried by said drum and mounted in the plane of the ratchet and operatively engaging with the latter, braking means for locking the drum against movement, a cam member interposed between the rotatable member and the drum for frictionally connecting the two together, said cam member having lobed portions riding beneath the pawls for releasing the pawls from the ratchet when the latter is moved in one direction, and means for moving the pawls into engagement with the ratchet when said cam is moved in the opposite direction.

CHARLES P. CIRAC.